(12) United States Patent
Dhanapal et al.

(10) Patent No.: US 10,757,733 B2
(45) Date of Patent: Aug. 25, 2020

(54) THROUGHPUT PERFORMANCE FOR LAA AND DSDS DEPLOYMENTS

(71) Applicant: Apple Inc., Cupertino, CA (US)

(72) Inventors: Muthukumaran Dhanapal, Dublin, CA (US); Sethuraman Gurumoorthy, San Jose, CA (US); Srirang A. Lovlekar, Cupertino, CA (US); Vijay Venkataraman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 16/233,221

(22) Filed: Dec. 27, 2018

(65) Prior Publication Data

US 2019/0208543 A1 Jul. 4, 2019

(30) Foreign Application Priority Data

Jan. 4, 2018 (CN) .......................... 2018 1 0007601

(51) Int. Cl.
| | | |
|---|---|---|
| *H04W 74/08* | (2009.01) | |
| *H04W 72/08* | (2009.01) | |
| *H04W 88/06* | (2009.01) | |
| *H04W 16/14* | (2009.01) | |
| *H04W 8/24* | (2009.01) | |
| *H04W 72/04* | (2009.01) | |
| *H04W 24/10* | (2009.01) | |
| *H04W 72/12* | (2009.01) | |
| *H04W 76/15* | (2018.01) | |

(Continued)

(52) U.S. Cl.
CPC ......... *H04W 74/0808* (2013.01); *H04W 8/24* (2013.01); *H04W 16/14* (2013.01); *H04W 24/10* (2013.01); *H04W 72/0453* (2013.01); *H04W 72/082* (2013.01); *H04W 72/1215* (2013.01); *H04W 88/06* (2013.01); *H04W 48/16* (2013.01); *H04W 76/15* (2018.02); *H04W 88/02* (2013.01)

(58) Field of Classification Search
CPC ......... H04W 74/0808; H04W 72/1215; H04W 72/082; H04W 88/06; H04W 16/14
See application file for complete search history.

(56) References Cited

U.S. PATENT DOCUMENTS

| | | |
|---|---|---|
| 8,406,741 B2 | 3/2013 | Kang |
| 8,519,847 B2 | 8/2013 | Honkanen |

(Continued)

FOREIGN PATENT DOCUMENTS

| | | |
|---|---|---|
| WO | WO 2018/125686 A2 | 7/2018 |

*Primary Examiner* — Mohammad S Anwar
(74) *Attorney, Agent, or Firm* — Kowert, Hood, Munyon, Rankin & Goetzel, P.C.

(57) ABSTRACT

A user equipment device (UE) may receive a schedule for a listen before talk (LBT) procedure for a secondary component carrier on a first subscription associated with the UE that includes a radio frequency resource of the UE. The UE may determine a requirement to perform at least one operation on a second subscription associated with the UE that also includes the radio frequency resource. The UE may determine that performance of the at least one operation (at least partially) interferes (time overlaps) with performance of the LBT procedure. In response, the UE may initiate at least one scheduling operation at the UE to avoid interference between performance of the at least one operation on the second subscription and performance of the LBT procedure on the first subscription.

20 Claims, 12 Drawing Sheets

(51) Int. Cl.
*H04W 48/16* (2009.01)
*H04W 88/02* (2009.01)

(56) References Cited

U.S. PATENT DOCUMENTS

| | | |
|---|---|---|
| 9,220,083 B2 | 12/2015 | Nikkelen |
| 10,334,558 B2 | 6/2019 | Gopal |
| 2015/0031382 A1* | 1/2015 | Damnjanovic ... H04W 52/0216 455/452.1 |
| 2016/0183249 A1* | 6/2016 | Lei .......................... H04L 5/001 370/336 |
| 2018/0368098 A1* | 12/2018 | Gopal .................... H04W 76/15 |
| 2018/0368099 A1* | 12/2018 | Chen ...................... H04W 48/18 |
| 2019/0028987 A1 | 1/2019 | Otwani |
| 2019/0110236 A1 | 4/2019 | Huang |
| 2019/0116488 A1 | 4/2019 | Kumar |

\* cited by examiner

THROUGHPUT PERFORMANCE FOR LAA AND DSDS DEPLOYMENTS

PRIORITY DATA

This application claims benefit of priority to Chinese Application No. 201810007601.3, titled "Throughput Performance for LAA and DSDS Deployments", filed Jan. 4, 2018, which is hereby incorporated by reference in its entirety as though fully and completely set forth herein.

FIELD OF THE INVENTION

The present application relates to wireless devices, and more particularly to a system and method for improving throughput performance for License Assisted Access (LAA) and/or enhanced LAA (eLAA) and Dual SIM/Dual standby (DSDS) deployments.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs (e.g., 5G New Radio (5G NR)) often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one which uses a GSM (Global System for Mobile Communications) RAT or a "1X" (Code Division Multiple Access 2000 (CDMA2000) 1X) RAT that supports voice calls, among other possibilities.

Some UE devices use a single radio to support operation on multiple cellular RATs. For example, some UE devices use a single radio to support operation on both LTE and GSM networks. The use of a single radio for multiple RATs makes transitioning between networks, such as in response to a page message for an incoming voice call or circuit switched service, more complex. In addition, the use of a single radio for multiple RATs presents certain power usage and performance issues.

In addition, introduction of unlicensed bands for improved performance further complicates the use of a single radio to support multiple RATs (or multiple subscriptions). For these reasons, existing UE devices that use at least one radio to support concurrent operation on multiple subscriptions may experience performance degradation when attempting to leverage unlicensed bands for improved performance making it desirable to provide additional options for leveraging unlicensed bands while maintaining multiple concurrent cellular communication connections (or subscriptions) on a single radio.

SUMMARY OF THE INVENTION

Embodiments described herein relate to a User Equipment device (UE) and associated methods for performing time multiplexing and/or time sharing of radio frequency (RF) resources, such as a radio. A UE may include two or more subscriber identity modules (SIMs). A radio(s) may be coupled to the SIMs and may be configured to perform data communications supporting multiple subscriptions.

In some embodiments, a UE may receive a schedule for a listen before talk (LBT) procedure for a secondary component carrier on a first subscription associated with the UE. The performance of the LBT procedure may include tuning an RF resource (or require that an RF resource be tuned) (e.g., a radio of the UE) to the first subscription. The UE may determine a requirement to perform at least one operation on a second subscription associated with the UE. In some embodiments, the at least one operation may have a higher priority than the LBT procedure. In addition, the at least one operation may include tuning the RF resource (or require that the RF resource be tuned) to the second subscription. The UE may determine that performance of the at least one operation (at least partially) interferes (or conflicts) with the LBT procedure. In other words, the UE may determine that the RF resource is required for performance of both the at least one operation and the LBT procedure and that the at least one operation time overlaps with performance of the LBT procedure. The UE may initiate at least one scheduling operation at the UE to avoid interference between performance of the at least one operation on the second subscription and performance of the LBT procedure on the first subscription. In some embodiments, the at least one operation may include any (any combination of, and/or all of) an out of service (OOS) scan on the second subscription, an extended OOS scan on the second subscription, an extended page decoding on the second subscription, and/or an extend receiver measurement on the second subscription. In some embodiments, the at least one scheduling operation may include any (any combination of, and/or all of) requesting a temporary deactivation of the LBT procedure until completion of the at least one operation, prioritizing (or re-prioritizing) the LBT procedure over the at least one operation, and/or requesting a delay of the LBT procedure until completion of the at least one operation.

In some embodiments, the secondary component carrier may be on an unlicensed band. In some embodiments, prior to receiving the secondary component carrier, the UE may receive a primary component carrier on the first subscription. The primary component carrier may be on a licensed or unlicensed band.

In some embodiments, the systems, techniques, and methods described herein may: (1) improve throughput performance on the first subscription; (2) enhance or improve power performance at the UE via optimized radio resource sharing (e.g., optimized transmit and receive arbitration and/or scheduling); (3) provide a seamless user experience across the first and second subscriptions; and/or (4) for a Dual SIM/Dual Standby (DSDS) scenario, allow for more widespread use of unlicensed bands (e.g., allow for more widespread implementation of LAA and/or eLAA for DSDS UEs).

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
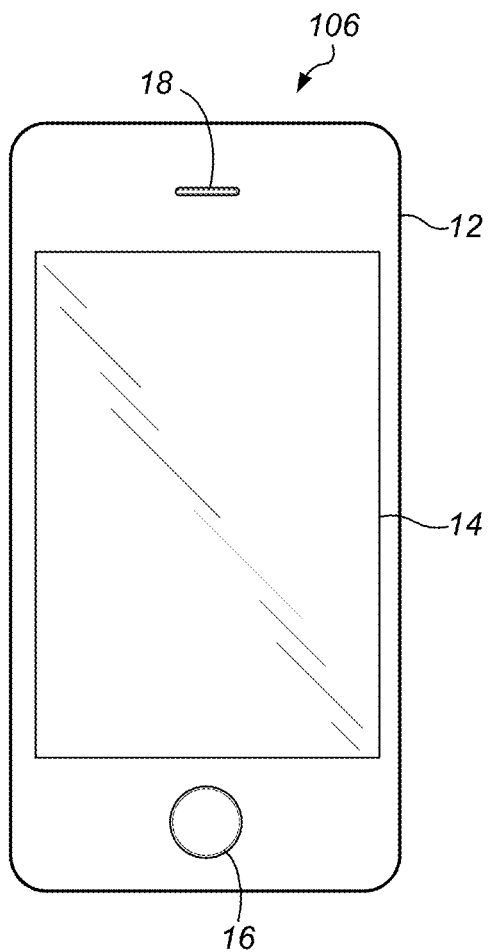
FIG. 1 illustrates an example user equipment (UE) according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive
DSDA: Dual SIM/Dual Active
DSDS: Dual SIM/Dual Standby Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1XRTT or other CDMA radio access technologies), Long Term Evolution (LTE), Advanced LTE, 5G New Radio (5G NR) and/or other RATs. For example, the UE 106 may support at least two radio access technologies such as LTE and GSM or LTE and 5G NR. As another example, the UE may support multiple concurrent subscriptions to the same radio access technology such LTE or 5G NR. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains that operate on the same frequency. In another embodiment, the UE 106 comprises two or more radios, i.e., two or more TX/RX chains (two or more TX chains and two or more RX chains).

In some embodiments described herein, the UE 106 comprises two antennas which communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain.

In some embodiments, the two receiver chains operate as a pair and time multiplex among two or more RATs, such as a first LTE connection and one or more other RATs such as a second LTE connection, 5G NR, GSM or CDMA1x. In some embodiments described herein the UE 106 comprises one transmitter chain and two receiver chains, wherein the transmitter chain and the two receiver chains (acting as a pair) time multiplex between two (or more) subscriptions, such as first and second LTE subscriptions, LTE and 5G NR subscriptions or LTE and UMTS subscriptions.

Each antenna may receive a wide range of frequencies such as from 600 MHz up to 3 GHz. Thus, for example, the local oscillator of the two receiver chains may tune to a specific frequency such as an LTE frequency band, where the first receiver chain receives samples from antenna 1 and the second receiver chain receives samples from antenna 2, both on the same frequency (e.g., if they use the same local oscillator). The wireless circuitry in the UE 106 can be configured in real time depending on the desired mode of operation for the UE 106.

Figure 2:
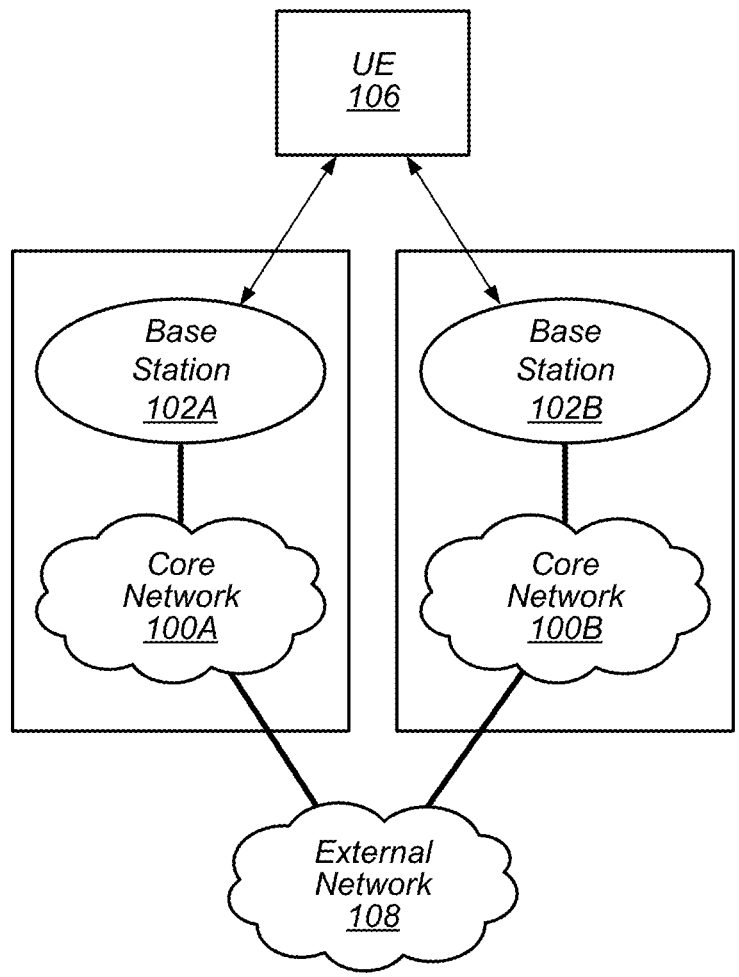
FIG. 2 illustrates an example wireless communication system where a UE communicates with two base stations using two different RATs, according to some embodiments.

FIG. 2—Communication System

FIG. 2 illustrates an exemplary (and simplified) wireless communication system, according to some embodiments. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS ((including UMTS frequency division duplex (UMTS-FDD) and UMTS time division duplex (UMTS-TDD)), LTE, LTE Advanced (LTE-A), 5G NR, 3GPP2 CDMA2000 (e.g., 1xRTT, 1xEV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., 5G NR, LTE, GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and 5G NR, LTE and GSM, LTE and CDMA2000 1xRTT, and/or any other combination of RATs) might be coupled to a core network that also supports the different cellular communication technologies. In some embodiments, the UE 106 may be configured to use a first RAT that is a packet-switched technology (e.g., LTE) and a second RAT that is also packet-switched technology (e.g., LTE or 5G NR).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
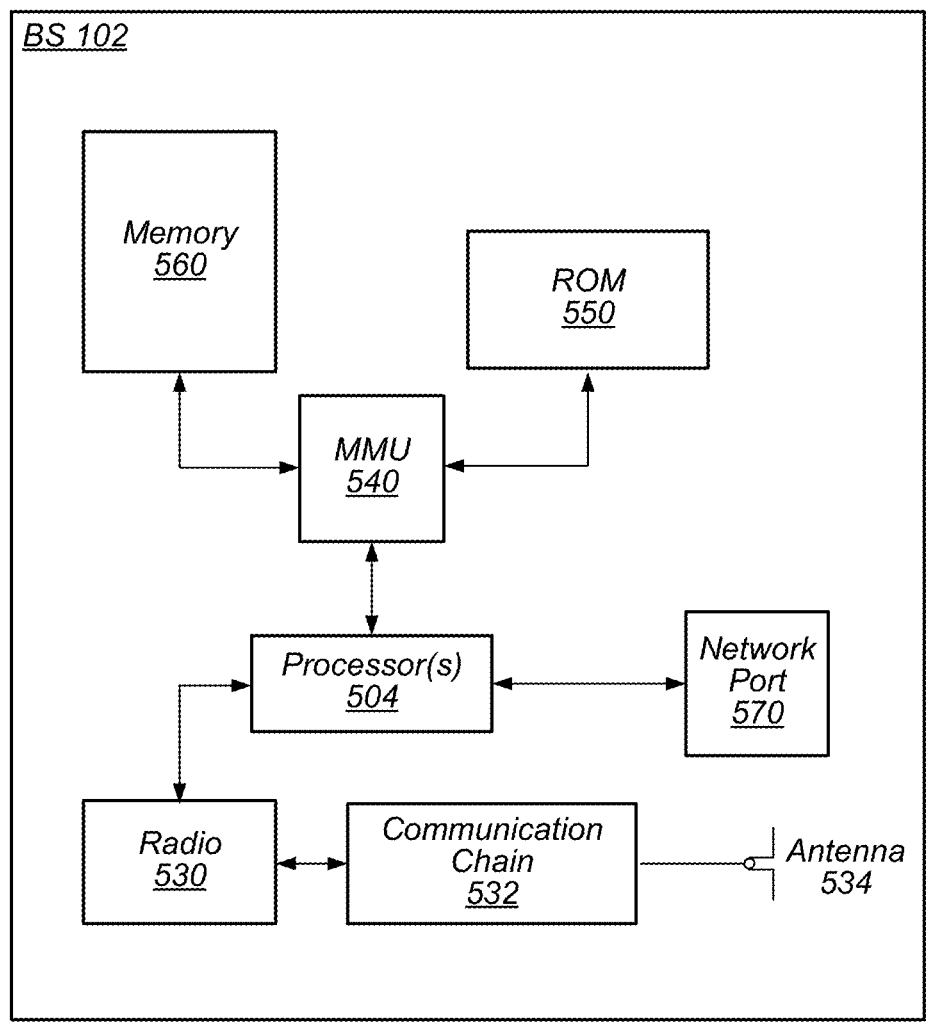
FIG. 3 is an example block diagram of a base station, according to some embodiments.

FIG. 3—Base Station

FIG. 3 illustrates an exemplary block diagram of a base station 102, according to some embodiments. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, 5G NR, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
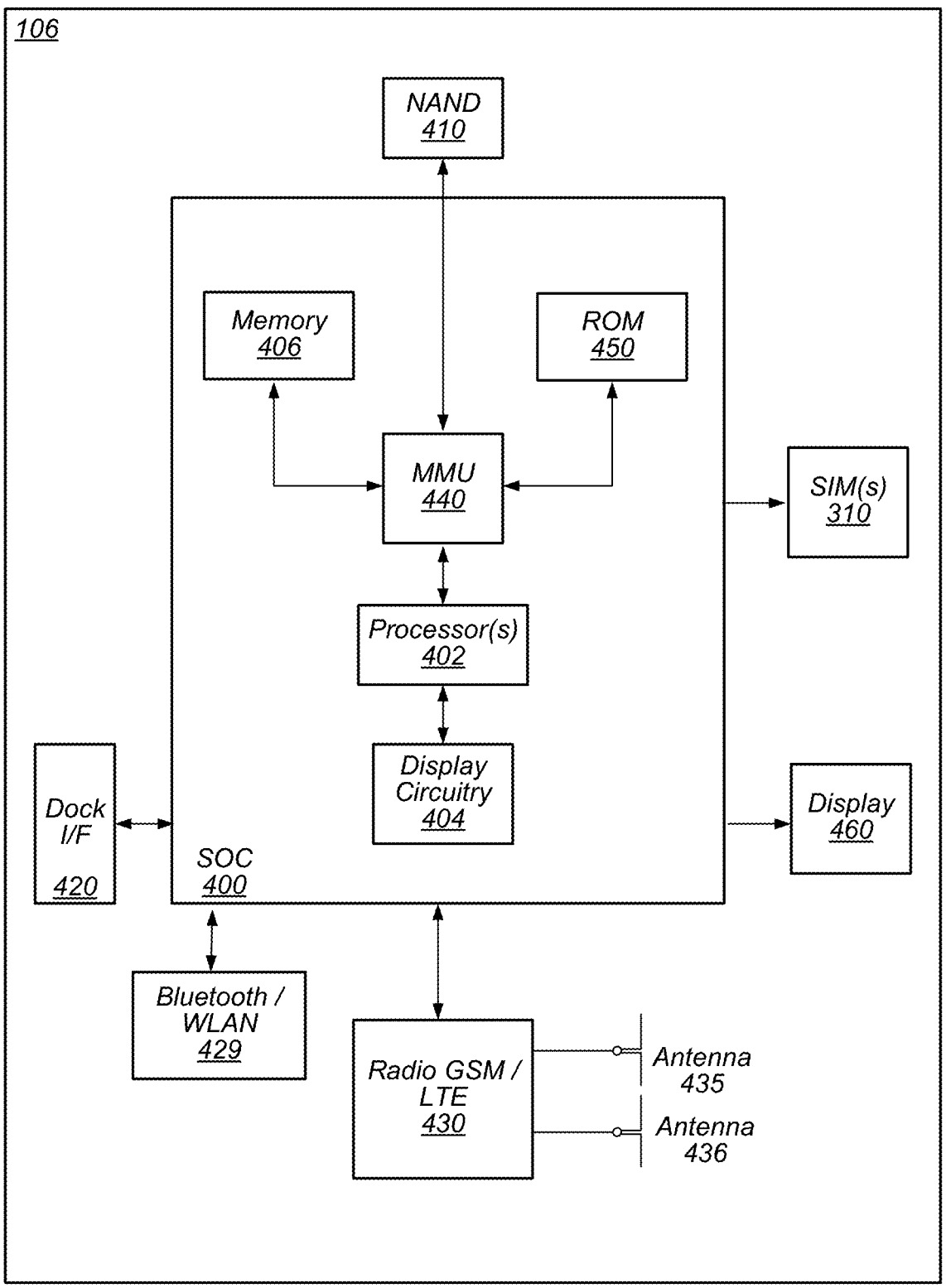
FIG. 4 is an example block diagram of a UE, according to some embodiments.

FIG. 4—User Equipment (UE)

FIG. 4 illustrates an example simplified block diagram of a UE 106, according to some embodiments. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

The UE 106 may further comprise one or more SIMs (Subscriber Identity Modules) 310 that comprise SIM (Subscriber Identity Module) functionality. The term "SIM" or "SIM entity" is intended to include any of various types of SIM implementations or SIM functionality, such as one or more UICC(s) (Universal Integrated Circuit Card(s)) cards, one or more eUICCs, one or more eSIMs, either removable or embedded, etc. In some embodiments, the UE 106 comprises at least two SIMs 310. Each SIM may execute one or more Subscriber Identity Module (SIM) applications and/or otherwise implement SIM functionality. Thus, each SIM 310 may be a single smart card that may be embedded, e.g., may be soldered onto a circuit board in the UE 106, or each SIM 310 may be implemented as a removable smart card. Thus the SIM(s) 310 may be one or more removable smart cards (such as UICC cards, which are sometimes referred to as "SIM cards"), and/or the SIMs 310 may be one or more embedded cards (such as embedded UICCs (eUICCs), which are sometimes referred to as "eSIMs" or "eSIM cards"). In some embodiments (such as when the SIM(s) 310 include an eUICC), one or more of the SIM(s) 310 may implement embedded SIM (eSIM) functionality; in such an embodiment, a single one of the SIM(s) 310 may execute multiple SIM applications. Each of the SIMs 310 may include components such as a processor and/or a memory; instructions for performing SIM/eSIM functionality may be stored in the memory and executed by the processor. In some embodiments, the UE 106 may comprise a combination of removable smart cards and fixed/non-removable smart cards (such as one or more eUICC cards that implement eSIM functionality), as desired. For example, the UE 106 may comprise two embedded SIMs 310, two removable SIMs 310, or a combination of one embedded SIMs 310 and one removable SIMs 310. Various other SIM configurations are also contemplated.

As noted above, in some embodiments, the UE 106 comprises two or more SIMs. The inclusion of two or more SIMs 310 in the UE 106 may allow the UE 106 to support two different telephone numbers and may allow the UE 106 to communicate on corresponding two or more respective networks. For example, a first SIM 310 may support a first RAT such as LTE, and a second SIM 310 support a second RAT such as 5G NR, LTE, and/or UMTS. Other implementations and RATs are of course possible. Where the UE 106 comprises two SIMs 310, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology. In another embodiment, the UE 106 supports Dual SIM Dual Standby (DSDS) functionality. The DSDS functionality may allow either of the two SIMs 310 in the UE 106 to be on standby waiting for a voice call and/or data connection. In DSDS, when a call/data is established on one SIM 310, the other SIM 310 is no longer active. In some embodiments, DSDx functionality (either DSDA or DSDS functionality) may be implemented with a single SIM (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 and/or the radio 430 of the UE device 106 may be configured to implement part or all of the features described herein, e.g., by executing program instructions stored on a memory medium (e.g., a non-transitory computer-readable memory medium). Alternatively (or in addition), one or more of the processor 402 and the radio 430 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
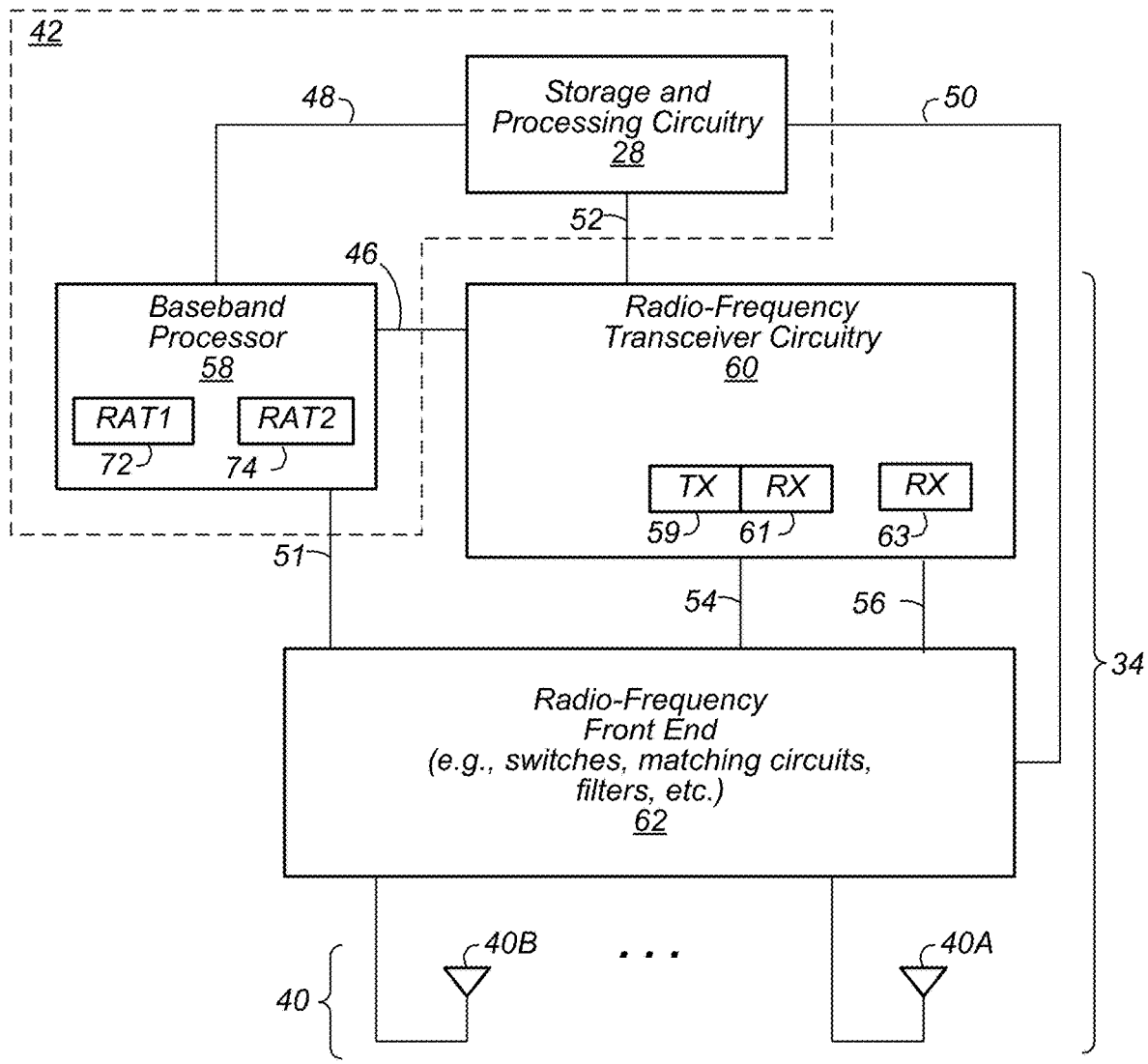
FIGS. 5A and 5B are example block diagrams of wireless communication circuitry in the UE, according to some embodiments.
Figure 5B:
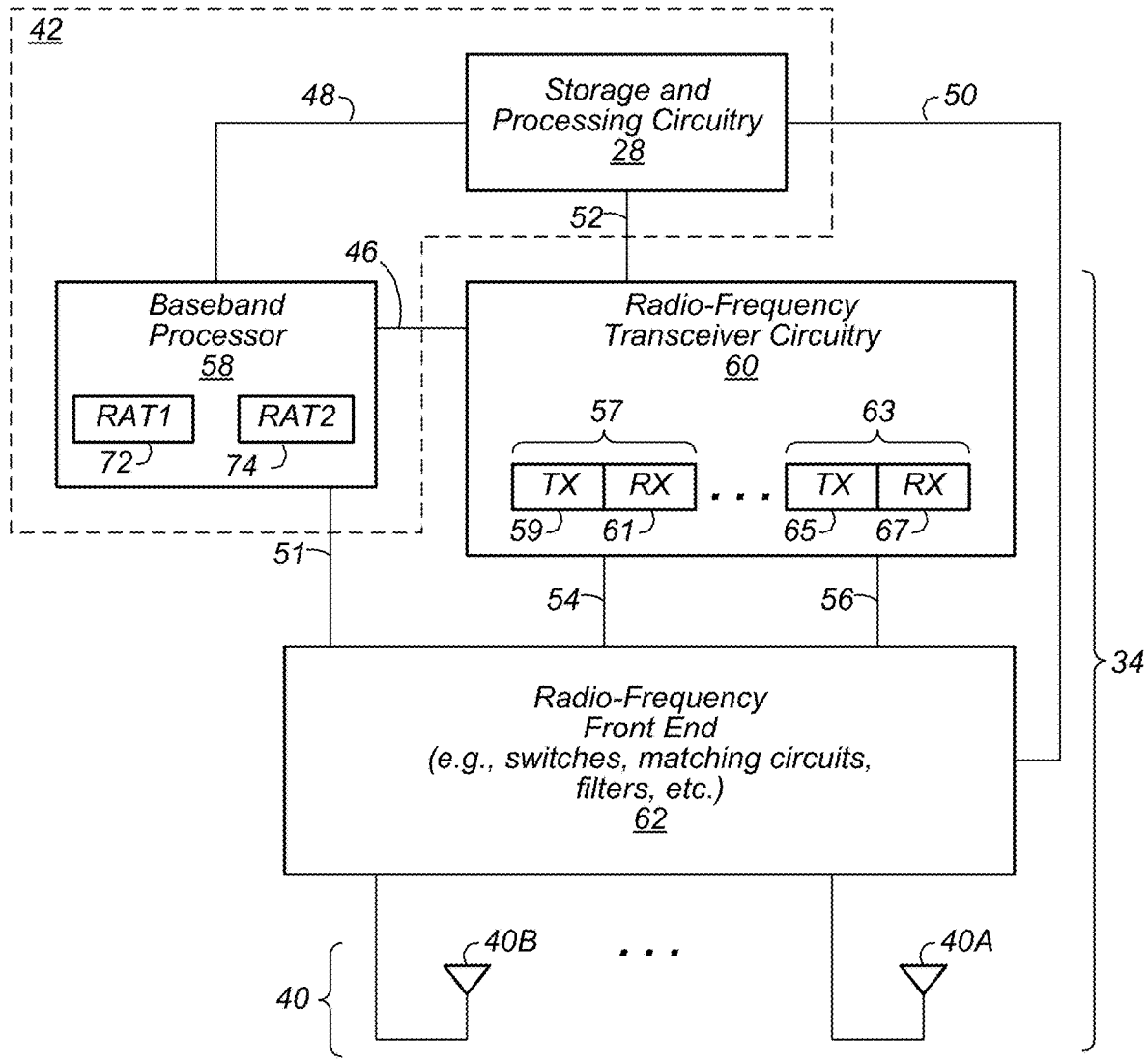

FIGS. 5A and 5B—UE Transmit/Receive Logic

FIG. 5A illustrates a portion of UE 106 according to some embodiments. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as RAT1logic 72 and RAT2 logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including, but not limited to, either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains, according to some embodiments. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a UMTS paging channel for incoming UMTS pages, one or both of the antennas may be temporarily used in receiving UMTS paging channel signals.

Control circuitry 42 may be used to execute software for handling more than one radio access technology. For example, baseband processor 58 may include memory and control circuitry for implementing multiple protocol stacks such as a UMTS protocol stack 72 and an LTE protocol stack 74. Thus, protocol stack 72 may be associated with a first radio access technology such as UMTS (as an example), and protocol stack 74 may be associated with a second radio access technology such as LTE (as an example). During operation, UE 106 may use UMTS protocol stack 72 to handle UMTS functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In some embodiments, one or both of the protocol stacks may be configured to implement the methods described in the flowcharts below.

In some embodiments of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support both LTE and UMTS traffic.

LTE LAA

In some implementation, LTE-LAA (License Assisted Access) is built upon carrier aggregation capabilities standardized for LTE-Advanced. Carrier aggregation seeks to increase overall bandwidth available to a user equipment device (UE) by enabling the UE to use more than one channel, either in the same band, or within another band. LTE-U/LTE-LAA may be deployed as downlink only, uplink and downlink, and/or frequency division duplexing (FDD)/time division duplexing (TDD) aggregation. In some implementations, LTE-LAA may increase capacity and speed of standard LTE data streams by using one or more additional channels in an unlicensed spectrum, such as 5 GHz. LTE-LAA may be considered a modified form of LTE in an unlicensed band. Downlink capacity and speed may be increased over standard LTE via carrier aggregation with the standard LTE connection. LTE-LAA may implement dynamic channel selection (e.g., to select a least used sub-band) and/or a Listen Before Talk (LBT) procedure (e.g., to avoid collisions with other users) to allow for co-existence with other users of the unlicensed spectrum. In some implementations, LTE-LAA may be further enhanced (e.g., LTE-eLAA) to include uplink channels (and uplink carrier aggregation) in the unlicensed band. In some implementations, LAA and eLAA may be run entirely in the unlicensed band (or spectrum).

Improved Throughput for LAA and DSDS Deployments

Figure 6:
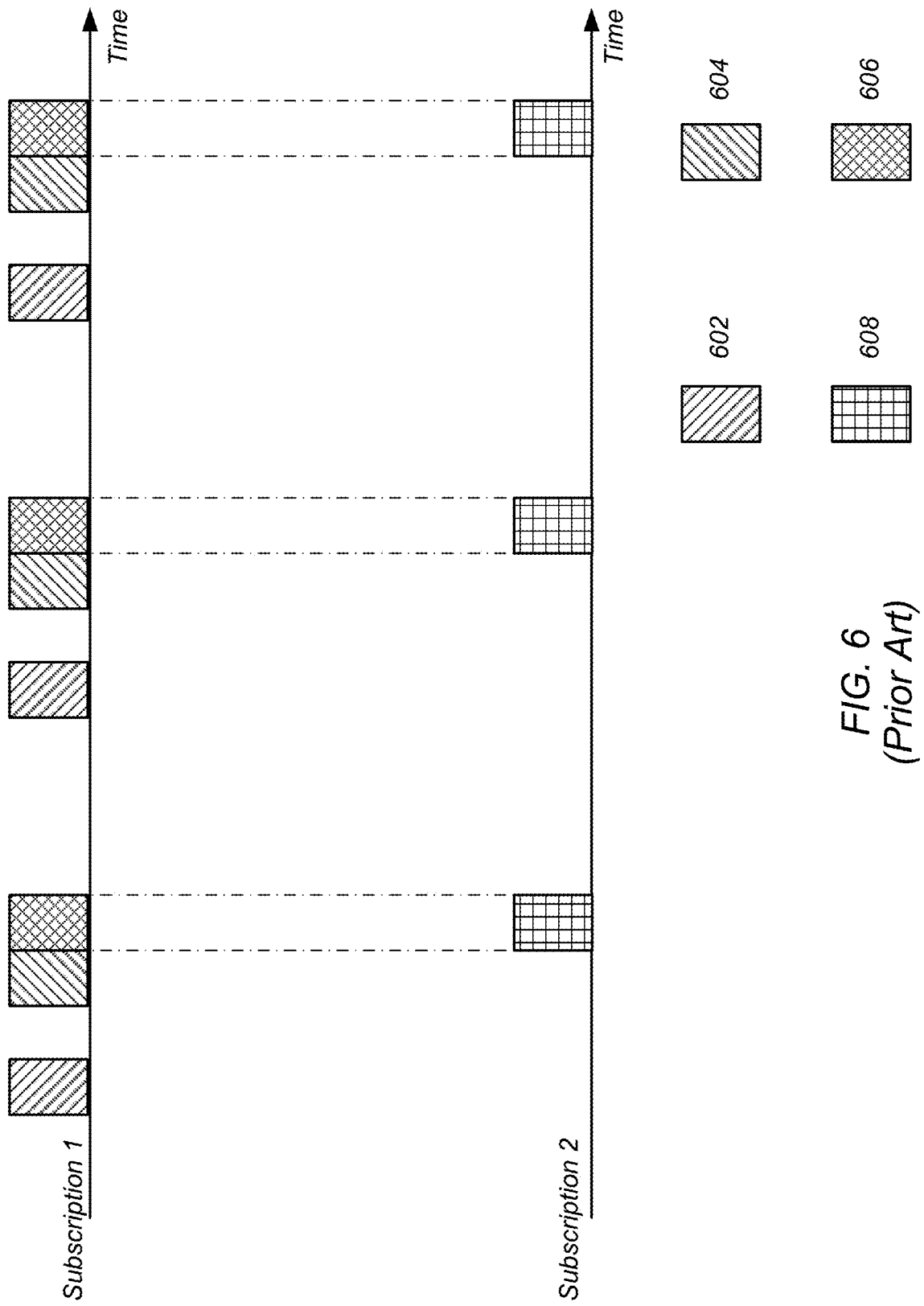
FIG. 6 illustrates an example of resource sharing for a multi-subscription UE, according to existing implementations.

In some existing implementations, a user may experience relatively low throughput performance when an LAA secondary component carrier (SCC) schedules a listen before talk (LBT) procedure for a first subscription and the LAA SCC fails to transmit/receive due to lose of radio frequency (RF) resources to a second subscription in a multi-subscription scenario such as Dual SIM/Dual Standby (DSDS), e.g., as compared to a single subscription scenario in which the LAA SCC does not fail to transmit/receive. In other words, in some scenarios, a DSDS UE may experience low throughput performance when a first subscription loses RF resources (e.g., due to radio sharing) to a second subscription during an LBT procedure. For example, FIG. 6 illustrates resource sharing for a multi-subscription UE during an LBT procedure, according to existing implementations. As shown, the UE may have a first subscription (Subscription 1) and a second subscription (Subscription 2) sharing a common RF resource (e.g., the UE may have a single transmitter shared between the first and second subscriptions). Thus, at a first point in time, the UE may receive a first downlink primary component carrier (DL PCC) 602 (e.g., from a primary cell or base station). Then, after a dwell period, the UE may receive an LAA DL LBT transmission 604. However, after receiving the LAA DL LBT transmission 604, the UE may be unable to complete an LAA UL LBT transmission 606 due to resource sharing with the second subscription. In other words, an out of service scan or scans 608 performed on the second subscription may supersede the LAA UL LBT transmission, e.g., the UE may prioritize the OOS scans 608 over the LAA LBT activities 604 and 606 and assign the RF resources to the second subscription to perform the OOS scans 608. Thus, the second subscription's higher priority procedure may lead to failure of the LBT procedure resulting in a reduction of throughput performance on the first subscription.

FIGS. 7-10 illustrate examples of RF resource sharing for a multi-subscription UE, according to some embodiments. The example embodiments illustrated in FIGS. 7-10 may be used in conjunction with any of the systems or devices shown in the above Figures, among other devices, e.g., such as UE 106. In various embodiments, the example embodiments may be combined, may be performed (substantially) concurrently, in a different order than shown, interleaved, and so forth. In some embodiments, the RF resource sharing may be for downlink only (e.g., for LAA LBT procedures) or may be for both downlink (DL) and uplink (UL) (e.g., for eLAA LBT procedures). In other words, the RF resource sharing described herein may be used to improve throughput for both downlink and uplink procedures (or activities). More specifically, in some embodiments, the RF resource sharing described herein may: (1) improve throughput performance on an LAA and/or an eLAA SIM subscription; (2) enhance or improve power performance at the UE via optimized RF resource sharing (e.g., optimized transmit and receive arbitration and/or scheduling); (3) provide a seamless user experience across multiple SIM subscriptions; and/or (4) for a Dual SIM/Dual Standby (DSDS) scenario, allow for more widespread use of the unlicensed bands (e.g., allow for more widespread implementation of LAA and/or eLAA for DSDS UEs).

Figure 7:
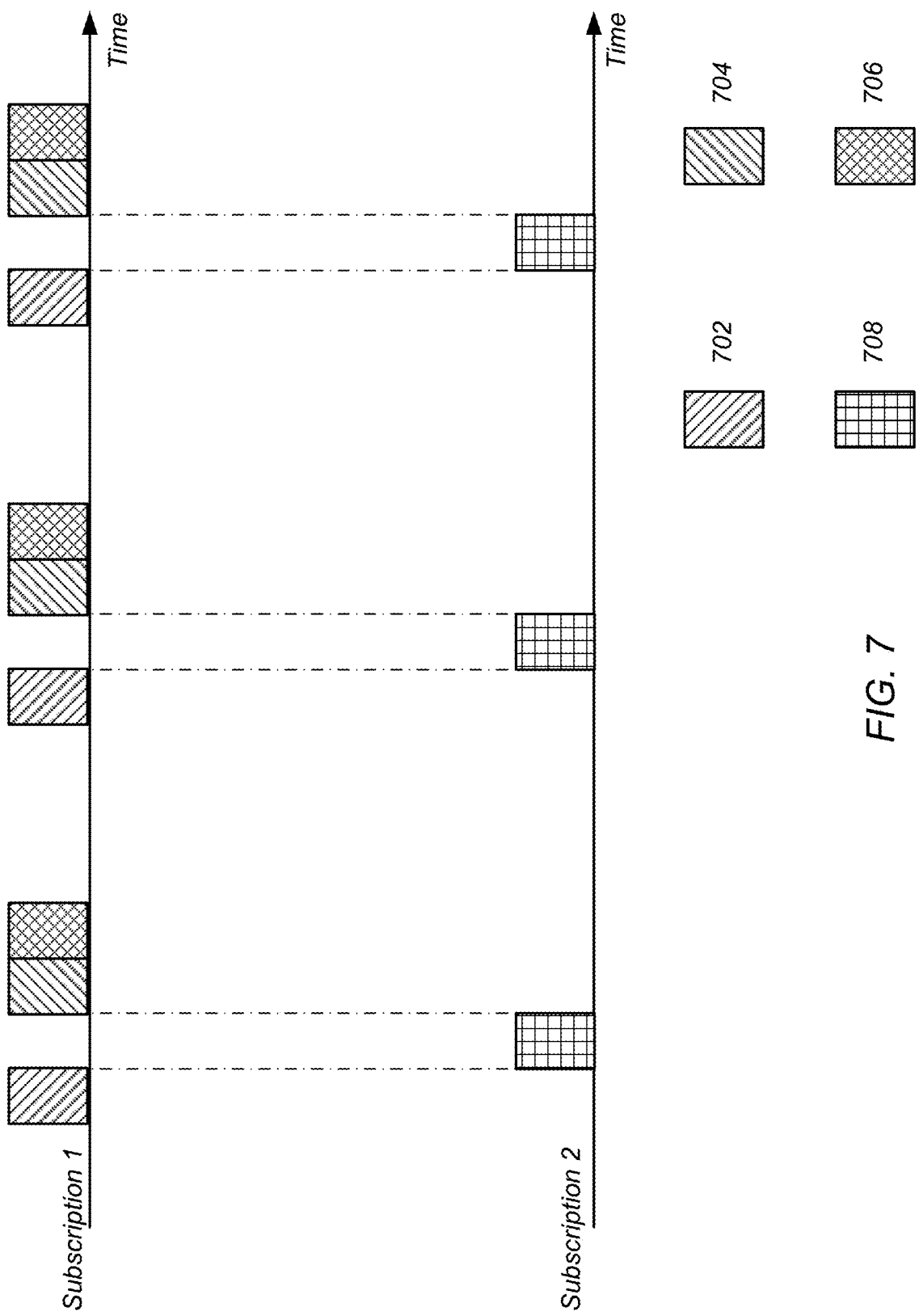
FIGS. 7-10 illustrate examples of resource sharing for a multi-subscription UE, according to some embodiments.

FIG. 7 illustrates an example of radio frequency (RF) resource sharing in which the RF resource may be time multiplexed between a first subscription and a second subscription, according to some embodiments. As shown, a UE, such as UE 106, may support first and second subscriptions (e.g., Subscription 1 and Subscription 2) and the first and second subscriptions may share RF resources, e.g., as described above in reference to FIG. 5A. In addition, the UE may, at a first point in time, receive from a primary service cell, such as base station 102, a DL/UL PCC 702 on the first subscription. In addition, the UE may be scheduled by a License Assisted Access (LAA) (or eLAA) secondary component carrier (SCC) for a listen before talk (LBT) procedure. Thus, in response, the UE may attempt to initiate LAA (or eLAA) LBT activities 704 and 706 ("LBT activities"). However, the UE may detect, e.g., based on one or more parameters and/or conditions at the UE (e.g., such as received signal strength indicator (RSSI), reference signal received power (RSRP), reference signal received quality (RSRQ)), that the second subscription has and/or will lose service. Thus, the UE may need to perform one or more out of service (OOS) scans 708 in order to regain and/or acquire service from a cell (or base station). In some embodiments, instead of prioritizing the OOS scans 708 on the second subscription, thereby interfering with the LBT activities, the UE may prioritize the first subscription's LBT activities 704 and 706 and schedule the OOS scans 708 to not interfere with the LBT activities 704 and 706. Thus, the LBT activities may maintain a typical transmit/receive timeline without interference of the OOS scans 708 on the second subscription.

Figure 8:
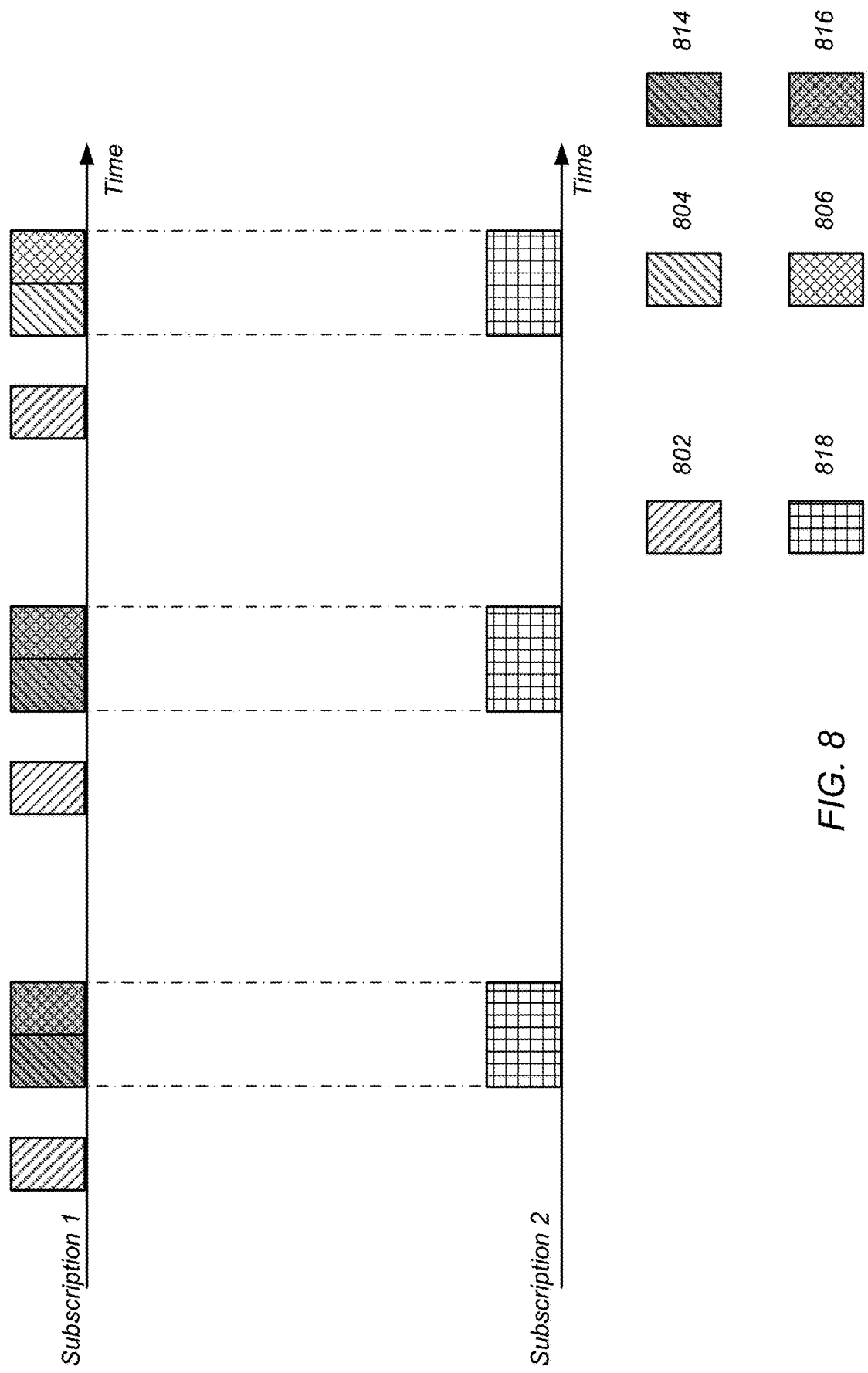

FIG. 8 illustrates an example of radio frequency (RF) resource sharing in which the RF resource may be time shared between a first subscription and a second subscription, according to some embodiments. As shown, a UE, such as UE 106, may support first and second subscriptions (e.g., Subscription 1 and Subscription 2) and the first and second subscriptions may share RF resources, e.g., as described above in reference to FIG. 5A. In addition, the UE may, at a first point in time, receive from a primary service cell, a DL/UL PCC 802 on the first subscription. In addition, the UE may be scheduled by an LAA/eLAA SCC for an LBT procedure. Thus, in response, the UE may attempt to initiate LAA/eLAA LBT activities 804 and 806 (LBT activities). However, the UE may detect, e.g., based on one or more parameters and/or conditions at the UE (e.g., such as received signal strength indicator (RSSI), reference signal received power (RSRP), reference signal received quality (RSRQ)), that the second subscription has and/or will lose service and one or more out of service (OOS) scans. Thus, the UE may need to perform OOS scans in order to regain and/or acquire service from a cell (or base station). Further, in some embodiments, the UE may detect that the OOS scans 818 may require a longer duration of RF resources and may impact the LBT activities 804 and 806. Thus, in some embodiments, the UE may delay or temporarily deactivate the LAA/eLAA SCC (e.g., as illustrated by 814 and 816) to allow the OOS scans 808 to not interfere with LBT activities. In other words, the LAA/eLAA SCC may be deactivated during a period of longer OOS scans 818. In some embodiments, the UE may use an awareness framework and/or a 3GPP Release 13 In Device Co-existence (IDC) framework to request temporary deactivation of the LAA/eLAA SCC. In addition, in some embodiments, once longer OOS scans 818 are no longer required, the UE may reactivate the LAA/eLAA SCC and schedule OOS scans on the second subscription as described above in reference to FIG. 7.

Figure 9:
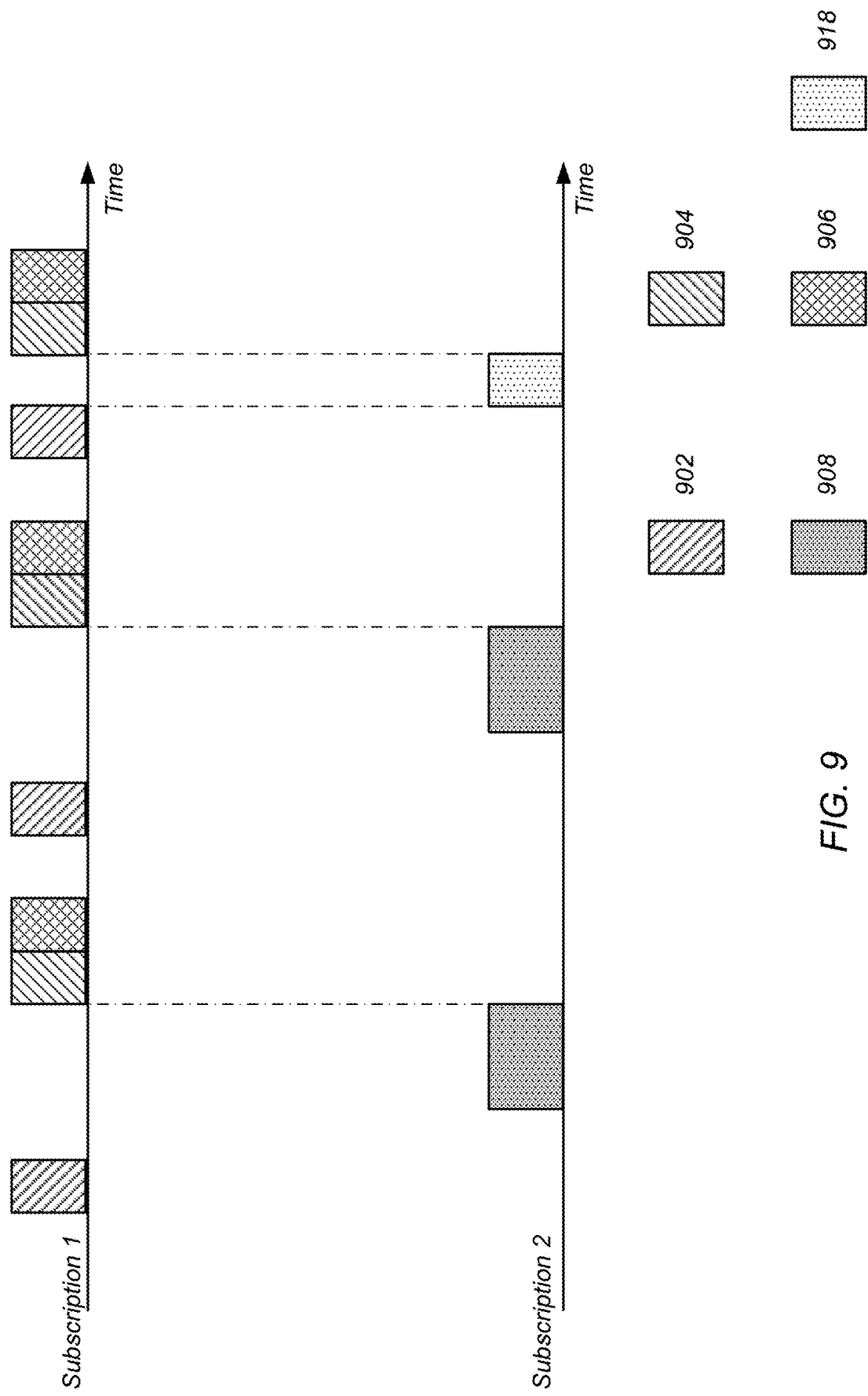

FIG. 9 illustrates another example of radio frequency (RF) resource sharing in which the RF resource may be time multiplexed between a first subscription and a second subscription, according to some embodiments. As shown, a UE, such as UE 106, may support first and second subscriptions (e.g., Subscription 1 and Subscription 2) and the first and second subscriptions may share RF resources, e.g., as described above in reference to FIG. 5A. In addition, the UE may, at a first point in time, receive from a primary service cell, a DL/UL PCC 902 on the first subscription. In addition, the UE may be scheduled by an LAA/eLAA SCC for an LBT procedure. Thus, in response, the UE may attempt to initiate LAA/eLAA LBT activities 904 and 906 (LBT activities). However, the UE may detect, e.g., based on one or more parameters and/or conditions at the UE, that the second subscription will need to perform extended page decodes and/or extended downlink receiver measurements. Such extended periods on the second subscription may impact the timeline of the LBT activities. Thus, in some embodiments, the UE may prioritize that the extended measurements/decodes 908 on the second subscription and request (e.g., to the network) a delay of the LBT activities. Such a request may change transmit/receive periodicity of the LBT activities and allow the LBT activities on the first subscription to be aligned with the extended measurements/decodes on the second subscription. Further, in some embodiments, once the UE determines that extended measurements/decodes are no longer required on the second subscription, the UE may prioritize the LBT activities and schedule the measurements/decodes 918 to not interfere with the LBT activities, e.g., as described above with respect to the OOS scans of FIG. 7.

Figure 10:
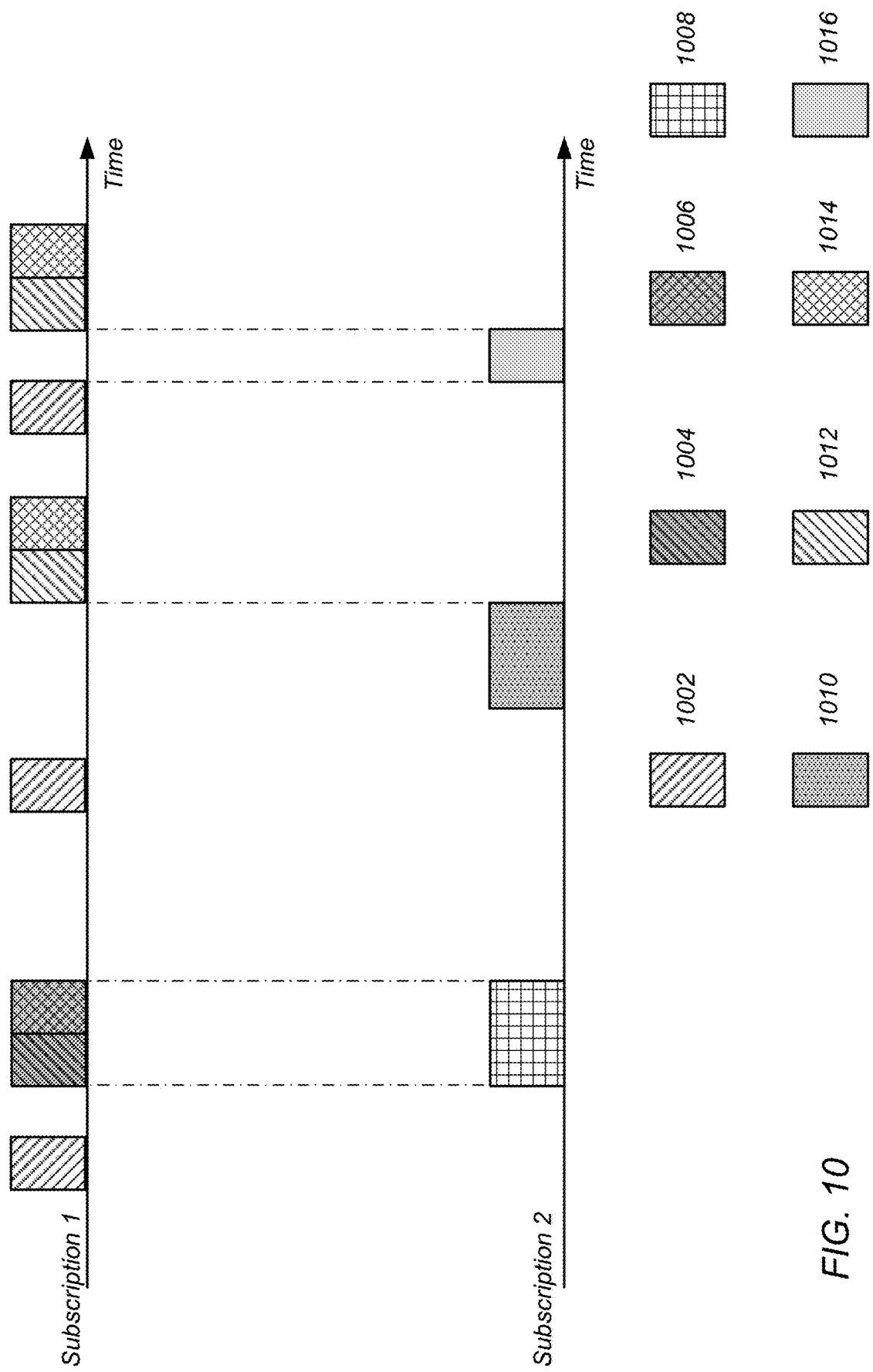

FIG. 10 illustrates a further example of radio frequency (RF) resource sharing in which the RF resource may be time multiplexed between a first subscription and a second subscription, according to some embodiments. As shown, a UE, such as UE 106, may support first and second subscriptions (e.g., Subscription 1 and Subscription 2) and the first and second subscriptions may share RF resources, e.g., as described above in reference to FIG. 5A. In addition, the UE may, at a first point in time, receive from a primary service cell, a DL/UL PCC 1002 on the first subscription. In addition, the UE may be scheduled by an LAA/eLAA SCC for an LBT procedure. Thus, in response, the UE may attempt to initiate LAA/eLAA LBT activities 1012 and 1014 (LBT activities). However, the UE may detect, e.g., based on one or more parameters and/or conditions at the UE, that the second subscription has and/or will lose service and one or more out of service (OOS) scans. Thus, the UE may need to perform OOS scans in order to regain and/or acquire service from a cell (or base station). Further, in some embodiments, the UE may detect that the OOS scans 1008 may require a longer duration of RF resources and may impact the LBT activities. Thus, in some embodiments, the UE may delay or temporarily deactivate the LAA/eLAA SCC (e.g., as illustrated by 1004 and 1006) to allow the OOS scans 1008 to not interfere with LBT activities. In other words, the LAA/eLAA SCC may be deactivated during a period of longer OOS scans 1008. In some embodiments, the UE may use an awareness framework and/or a 3GPP Release 13 In Device Co-existence (IDC) framework to request temporary deactivation of the LAA/eLAA SCC. Further, in some embodiments, at a second time, the UE may restart the LBT activities, however, the UE may detect e.g., based on one or more parameters and/or conditions at the UE, that the second subscription will need to perform extended page decodes and/or extended downlink receiver measurements. Such extended periods on the second subscription may impact the timeline of the LBT activities. Thus, in some embodiments, the UE may prioritize that the extended measurements/decodes 1010 on the second subscription and request (e.g., to the network) a delay of the LBT activities. Such a request may change transmit/receive periodicity of the LBT activities and allow the LBT activities on the first subscription to be aligned with the extended measurements/decodes on the second subscription. Further, in some embodiments, once the UE determines that extended measurements/decodes are no long required and/or that longer OOS scans are not necessary on the second subscription (e.g., at a third time), the UE may prioritize the LBT activities and schedule the measurements/decodes and/or OOS scans 1016 to not interfere with the LBT activities.

Figure 11:
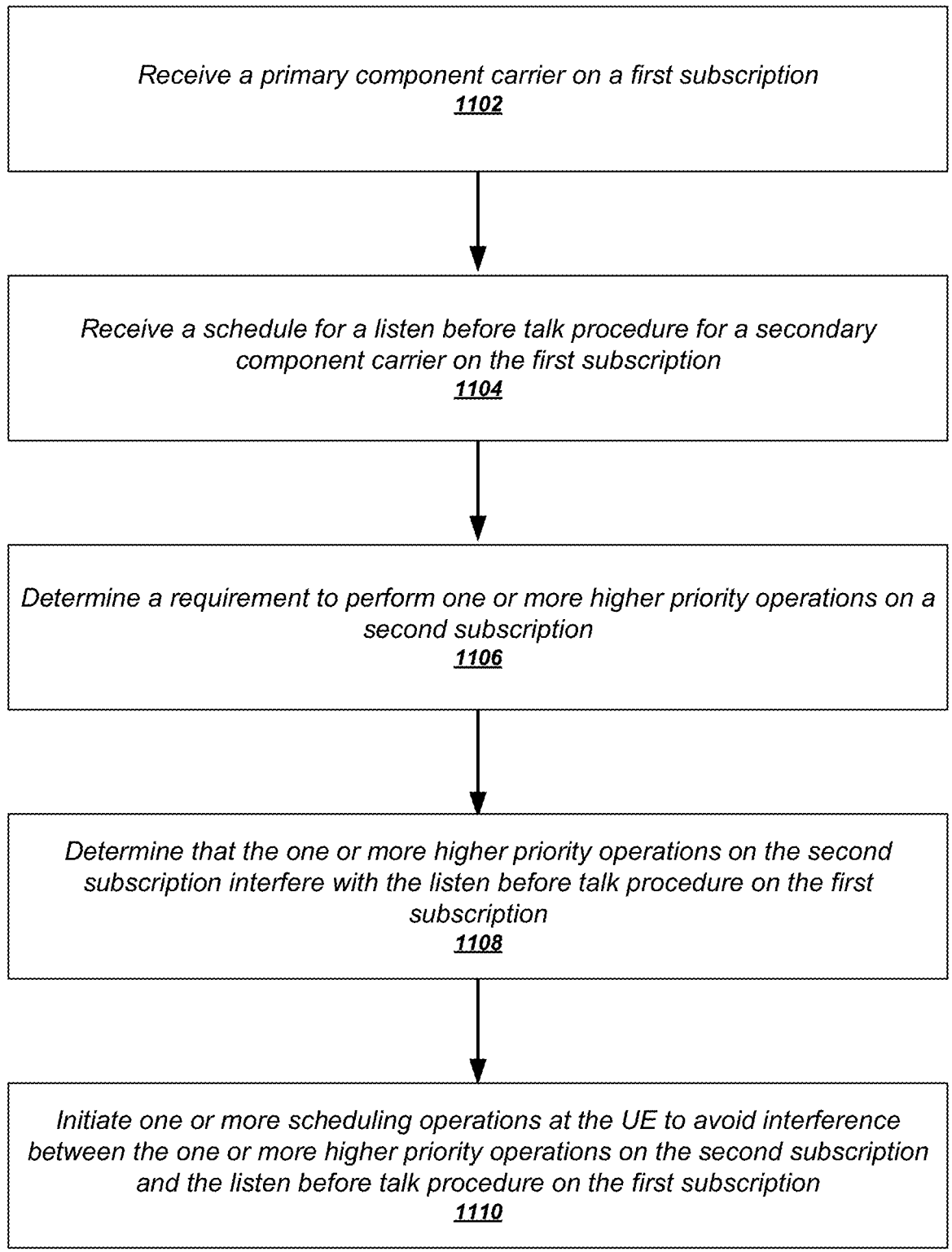
FIG. 11 illustrates a block diagram of an example of a method for radio frequency (RF) resource sharing in which the RF resource may be time multiplexed between a first subscription and a second subscription, according to some embodiments.

FIG. 11 illustrates a block diagram of an example of a method for radio frequency (RF) resource sharing in which the RF resource may be time multiplexed between a first subscription and a second subscription, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a user equipment device (UE), such as UE 106, may receive a primary component carrier on a first subscription associate with a first subscriber identity module (SIM) of the UE. In some embodiments, the UE may include a second SIM associated with a second subscription. The first SIM and the second SIM may be coupled to a radio of the UE. The radio may include a processing element and at least one antenna. In some embodiments, the radio may be shared (e.g., time multiplexed) between the first subscription and the second subscription. In some embodiments, the first subscription and the second subscription may operate according to different radio access technologies (RATs) or the same RAT. In some embodiments, the primary component carrier may be a downlink primary component carrier. In some embodiments, the primary component carrier may comprise a downlink primary component carrier and an uplink primary component carrier. In some embodiments, the primary component carrier may be on a licensed band. In some embodiments, the primary component carrier may be on an unlicensed band.

At 1104, the UE may receive a schedule for a listen before talk (LBT) procedure for a secondary component carrier on the first subscription, wherein performance of the LBT procedure includes tuning the radio (or requires the radio to be tuned) to the first subscription. In some embodiments, the secondary component carrier may be a downlink secondary component carrier. In some embodiments, the secondary component carrier may comprise both a downlink secondary component carrier and an uplink secondary component carrier. In some embodiments, the secondary component carrier may be on an unlicensed band.

At 1106, the UE may determine a requirement to perform at least one operation (and/or one or more operations) on the second subscription. In some embodiments, the at least one operation may have a higher priority than the LBT procedure. In addition, performance of the at least one operation may require the radio to be tuned to the second subscription. In some embodiments, to determine the requirement to perform the at least one operation on the second subscription, the UE may monitor at least one parameter related to channel conditions on the second subscription at the UE and detect that the at least one parameter indicates performance of the at least one operation. In some embodiments, the at least one parameter may be (or may be indicative of) received signal strength indicator (RSSI), reference signal received power (RSRP), and/or reference signal received quality (RSRQ). In other words, the at least one parameter may indicate (or be indicative of) channel quality on the second subscription.

At 1108, the UE may determine that performance of the at least one operation may interfere with the LBT procedure. In other words, the UE may determine that the first subscription and the second subscription both require the radio resources at a same, substantially same, and/or overlapping time period. Said another way, the UE may determine a radio scheduling conflict between performance of the at least one operation and performance of the LBT procedure. In some embodiments, the at least one operation may include one or more of: (1) an out of service (OOS) scan on the second subscription, (2) an extended OOS scan on the second subscription, (3) extended page decoding on the second subscription, and/or (4) extend receiver measurements on the second subscription.

At 1110, the UE may initiate at least one scheduling operation at the UE. The at least one scheduling operation may avoid interference between performance of the at least one operation on the second subscription and performance of the LBT procedure on the first subscription. In other words, the at least one scheduling operation may resolve the radio scheduling conflict between performance of the at least one operation and performance of the LBT procedure. In some embodiments, the at least one scheduling operation may include one or more of (or any of, or any combination of): (1) requesting a temporary deactivation of the LBT procedure until completion of the at least one operation; (2) prioritizing (or re-prioritizing) the LBT procedure over the at least one operation; and/or (3) requesting a delay (or a temporary delay) of the LBT procedure until completion of the at least one operation. In some embodiments, the at least one scheduling operation described herein may: (1) improve throughput performance on the first subscription; (2) enhance or improve power performance at the UE via optimized radio resource sharing (e.g., optimized transmit and receive arbitration and/or scheduling); (3) provide a seamless user experience across the first and second subscriptions; and/or (4) for a Dual SIM/Dual Standby (DSDS) scenario, allow for more widespread use of unlicensed bands (e.g., allow for more widespread implementation of LAA and/or eLAA for DSDS UEs). In some embodiments, scheduling operations described herein may be performed in any order, multiple times, in any combination, and/or responsive to particular conditions, e.g., as described above in reference to FIGS. 7-10.

As noted above, in some embodiments, the primary component carrier may be on a licensed band and the secondary component carrier may be on an unlicensed band. In some embodiments, the primary component carrier may be on an unlicensed band and the secondary component carrier may be on an unlicensed band. In some embodiments, the primary component carrier may be a downlink primary component carrier on a licensed band and the secondary component carrier may be a downlink secondary component carrier on an unlicensed band, e.g., in an LAA scenario. In some embodiments, the primary component carrier may be a downlink primary component carrier on an unlicensed band and the secondary component carrier may be a downlink secondary component carrier on an unlicensed band. In some embodiments, the primary component carrier may include a downlink primary component carrier on a licensed band and an uplink primary component carrier on a licensed band and the secondary component carrier may include a downlink secondary component carrier on an unlicensed band and an uplink secondary component carrier on an unlicensed band, e.g., in an eLAA scenario. In some embodiments, the primary component carrier may include a downlink primary component carrier on an unlicensed band and an uplink primary component carrier on an unlicensed band and the secondary component carrier may include a downlink secondary component carrier on an unlicensed band and an uplink secondary component carrier on an unlicensed band. Note that other combinations of primary component carriers and secondary component carriers on licensed and/or unlicensed bands are also envisioned.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a first subscriber identity module (SIM) associated with a first subscription;
a second SIM associated with a second subscription; and
a radio coupled to the first SIM and the second SIM, wherein the radio comprises:
a processing element; and
at least one antenna; and
wherein the radio is configured to:
receive a schedule for a listen before talk (LBT) procedure for a secondary component carrier on the first subscription, wherein performance of the LBT procedure includes tuning the radio to the first subscription;
determine a requirement to perform at least one operation on the second subscription, wherein the at least one operation has a higher priority than the LBT procedure, and wherein performance of the at least one operation includes tuning the radio to the second subscription;
determine that performance of the at least one operation interferes with the LBT procedure; and
initiate at least one scheduling operation at the UE to avoid interference between performance of the at least one operation on the second subscription and performance of the LBT procedure on the first subscription.

2. The UE of claim 1,
wherein the at least one operation comprises one or more of:
an out of service (OOS) scan on the second subscription;
an extended OOS scan on the second subscription;
an extended page decoding on the second subscription; or
an extend receiver measurement on the second subscription.

3. The UE of claim 1,
wherein to determine the requirement to perform at least one operation on the second subscription, the radio is further configured to:
monitor at least one parameter related to channel conditions on the second subscription at the UE; and
detect that the at least one parameter indicates performance of the at least one operation.

4. The UE of claim 3,
wherein the at least one parameter indicates channel quality on the second subscription.

5. The UE of claim 1,
wherein the at least one scheduling operation comprises one or more of:
requesting a temporary deactivation of the LBT procedure until completion of the at least one operation;
prioritizing the LBT procedure over the at least one operation; or
requesting a delay of the LBT procedure until completion of the at least one operation.

6. The UE of claim 1,
wherein the secondary component carrier comprises a downlink secondary component carrier.

7. The UE of claim 1,
wherein the secondary component carrier is on an unlicensed band.

8. The UE of claim 1,
wherein, prior to receiving the schedule for the LBT procedure, the radio is further configured to:
receive a primary component carrier on the first subscription.

9. The UE of claim 8,
wherein the primary component carrier comprises a downlink primary component carrier on a licensed band, wherein the secondary component carrier comprises a downlink secondary component carrier on an unlicensed band.

10. A non-transitory computer readable memory medium storing program instructions executable by processing circuitry of a user equipment device (UE) to:
receive a schedule for a listen before talk (LBT) procedure for a secondary component carrier on a first subscription associated with a first subscriber identity module (SIM) of the UE, wherein performance of the LBT procedure includes tuning radio frequency (RF) resources of the UE to the first subscription;
determine a requirement to perform one or more operations on a second subscription, wherein the one or more operations have a higher priority than the LBT procedure, and wherein performance of the one or more operations includes tuning the RF resources of the UE to the second subscription;
determine that performance of the one or more operations at least partially conflicts with the LBT procedure; and
initiate one or more scheduling operations to avoid the conflict between performance of the one or more operations on the second subscription and performance of the LBT procedure on the first subscription.

11. The non-transitory computer readable memory medium of claim 10,
wherein the one or more operations comprise:
an out of service (OOS) scan on the second subscription;
an extended OOS scan on the second subscription;
an extended page decoding on the second subscription; or
an extend receiver measurement on the second subscription.

12. The non-transitory computer readable memory medium of claim 10,
wherein the one or more scheduling operations comprise:
requesting a temporary deactivation of the LBT procedure until completion of the one or more operations;
prioritizing the LBT procedure over the one or more operations; or
requesting a delay of the LBT procedure until completion of the one or more operations.

13. The non-transitory computer readable memory medium of claim 10,
wherein the secondary component carrier is on an unlicensed band.

14. The non-transitory computer readable memory medium of claim 10,
wherein the program instructions are further executable by the processing circuitry to:
receive a primary component carrier on the first subscription.

15. The non-transitory computer readable memory medium of claim 14,
wherein the primary component carrier is on a licensed band, and wherein the secondary component carrier is on an unlicensed band.

16. The non-transitory computer readable memory medium of claim 14,
wherein the primary component carrier comprises a downlink primary component carrier on a licensed band and an uplink primary component carrier on a licensed band, wherein the secondary component carrier comprises a downlink secondary component carrier on an unlicensed band and an uplink secondary component carrier on an unlicensed band.

17. An apparatus, comprising:
a memory; and
a processing element in communication with the memory, wherein the processing element is configured to:
receive a schedule for a listen before talk (LBT) procedure for a secondary component carrier on a first subscription, wherein performance of the LBT procedure includes tuning a radio frequency (RF) resource to the first subscription;
determine a requirement to perform at least one operation on a second subscription, wherein the at least one operation has a higher priority than the LBT procedure, and wherein performance of the at least one operation includes tuning the RF resource to the second subscription;
determine that performance of the at least one operation conflicts with the LBT procedure; and
initiate at least one scheduling operation to avoid the conflict between performance of the at least one operation on the second subscription and performance of the LBT procedure on the first subscription.

18. The apparatus of claim 17,
wherein the at least one operation comprises one or more of:
an out of service (OOS) scan on the second subscription;
an extended OOS scan on the second subscription;
an extended page decoding on the second subscription; or
an extend receiver measurement on the second subscription.

19. The apparatus of claim 17,
wherein the at least one scheduling operation comprises one or more of:
generating instructions to request a temporary deactivation of the LBT procedure until completion of the at least one operation;
prioritizing the LBT procedure over the at least one operation; or generating instructions to request a delay of the LBT procedure until completion of the at least one operation.

20. The apparatus of claim 17,
wherein, prior to receiving the schedule for the LBT procedure, the processing element is further configured to:
   receive a primary component carrier on the first subscription, wherein the primary component carrier comprises a downlink primary component carrier on a licensed band, wherein the secondary component carrier comprises a downlink secondary component carrier on an unlicensed band.

\* \* \* \* \*